(No Model.)
L. H. NASH.
DISK WATER METER.
No. 548,584.          Patented Oct. 22, 1895.
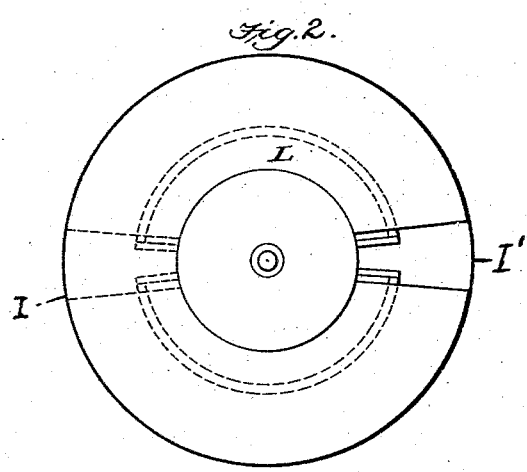
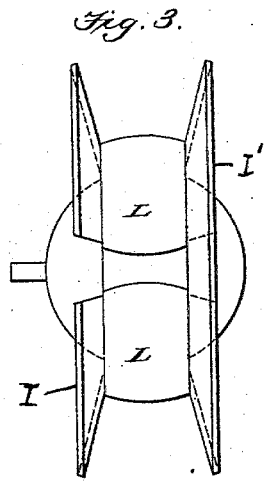
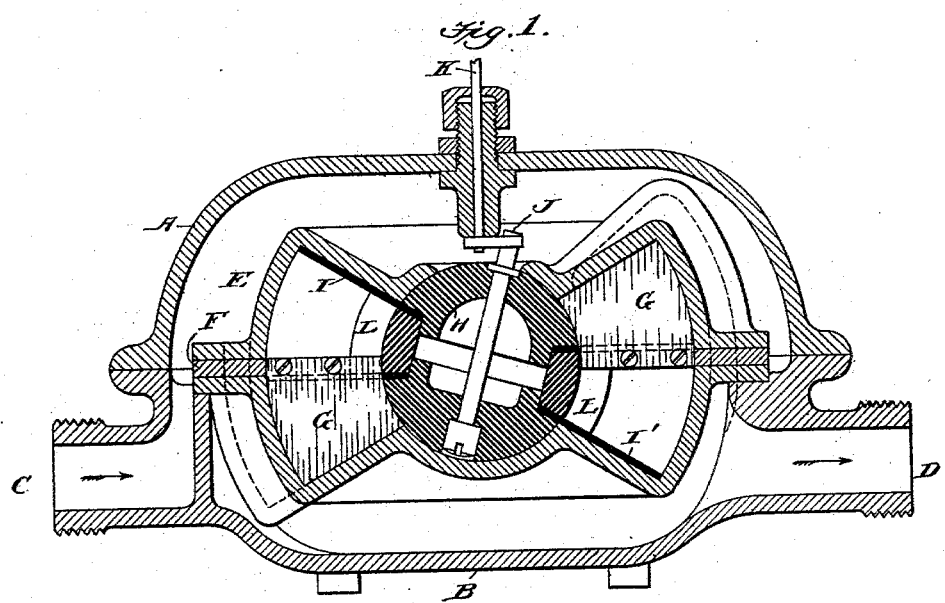
WITNESSES:
INVENTOR
Lewis Hallock Nash
BY
Johnson & Johnson
His ATTORNEYS.

UNITED STATES PATENT OFFICE.

LEWIS HALLOCK NASH, OF SOUTH NORWALK, CONNECTICUT.

DISK WATER-METER.

SPECIFICATION forming part of Letters Patent No. 548,584, dated October 22, 1895.

Application filed January 13, 1894. Serial No. 496,732. (No model.)

*To all whom it may concern:*

Be it known that I, LEWIS HALLOCK NASH, a citizen of the United States, residing at South Norwalk, in the county of Fairfield and State of Connecticut, have invented certain new and useful Improvements in Water-Meters, of which the following is a specification.

My present invention relates to nutating-piston meters; and it consists of certain parts and combinations of parts specifically pointed out in the claims concluding this specification.

Referring to the annexed drawings, Figure 1 is a vertical section through a meter embodying my present invention. Fig. 2 is a top view of the piston removed from the measuring-chamber, and Fig. 3 is a side view of the piston.

The following is a description of the structure shown in the annexed drawings.

A is the upper head-plate, and B the lower head-plate. C is the inlet-spud, and D the outlet-spud, thereof.

E is the measuring-case, which is formed of two independent chambers, one above and the other below the central partition F. G G are diaphragms or abutments in these chambers.

H is the piston provided with a plurality of disks I and I'.

J is a pin making connection with the registering mechanism through the spindle K.

The ball of the piston of the meter here shown has an enlarged zone L, as is clearly shown in Figs. 2 and 3. The enlarged zone extends between the two disks of the piston. It likewise extends beyond the line of the disk where it straddles the abutment, so as to form a bearing for the ball on the diaphragm independent of the ordinary bearing of the disk on this same part. This not only constitutes a guide for the piston at the abutment, but it furnishes a broad bearing-surface and wholly or partially relieves the disk of strain or wear at this point. This feature is not limited in its application to meters having multiple-disk pistons or multiple chambers; but it may be applied to any of the ordinary forms of nutating disks or cones by merely extending the bridge into the ball of the piston, so that the sides of the slot cut therein would form a guide or bearing. Neither is my invention in its broad aspects limited to the extension in any case of the ball beyond the line of the slot in the piston, as the lines of the slot in the piston and the slot in the ball might coincide, in which case the piston as well as the ball might be in friction contact with the diaphragm.

As far as I am aware nutating-pistons have heretofore been prevented from rotating solely by the bearing of the flange or disk of the piston or a projection therefrom on the abutment or on some stationary part. I believe that it is broadly new, among other things, with me to prevent the rotation of the piston by a bearing in the ball thereof, and whether this bearing be against the diaphragm, as shown in these drawings, or against some other stationary part.

In the foregoing specification I have referred to some of the modifications which might be adopted in practicing my invention, but I have not endeavored to specify all the modifications which might be employed, the object of this specification being to instruct persons skilled in the art to practice my invention in one of its preferred forms and to enable them to understand its nature; but I desire it to be distinctly understood that mention by me of a few modifications is in no way intended to exclude others not referred to but which are within the spirit and scope of my invention.

Many of the details illustrated and above described are not essential to the several features of my invention separately and broadly considered. This will be indicated in the concluding claims, where the omission of an element or the omission of reference to the detail features of the elements mentioned is intended to be a formal declaration of the fact that the omitted features or elements are not essential to the inventions therein severally covered.

What I claim is—

1. In a nutating piston meter, the combination of a measuring chamber provided with a diaphragm and a piston composed of a spherical bearing and disk, the spherical bearing being slotted to straddle the diaphragm.

2. In a nutating piston water meter, the combination of a measuring chamber provided with a diaphragm, of a piston composed of a spherical bearing and disk both slotted to straddle the diaphragm, the slot in the disk being broader than the slot in the spherical bearing, so that the disk does not come in frictional contact with the diaphragm.

3. In a nutating piston water meter, the combination of a case having a plurality of measuring chambers and a piston composed of a spherical bearing and a plurality of disks, the spherical bearing being provided with a zone of enlarged diameter, which zone is slotted to straddle said diaphragm.

4. In a nutating piston water meter, the combination of a case provided with a plurality of measuring chambers, a piston composed of a spherical bearing and a plurality of disks, said spherical bearing being provided with a zone of larger diameter, which zone and disks are slotted to straddle said diaphragm, the slot in the zone being narrower than the slot in the disk, so that the disk is relieved of frictional contact with said diaphragm.

5. In a nutating piston water meter, the combination of a measuring chamber provided with a diaphragm and a piston composed of a spherical bearing and disk; said spherical bearing working in suitable concave surfaces in the measuring chamber and also furnishing a lateral bearing to prevent the rotation of the piston.

LEWIS HALLOCK NASH.

Witnesses:
J. EDGAR BULL,
M. WILSON.